United States Patent [19]
Steiner et al.

[11] Patent Number: 5,261,730
[45] Date of Patent: Nov. 16, 1993

[54] BRAKE PRESSURE CONTROL DEVICE

[75] Inventors: Manfred Steiner, Winnenden; Werner Reichelt, Esslingen, both of Fed. Rep. of Germany

[73] Assignee: Mercedes-Benz AG, Fed. Rep. of Germany

[21] Appl. No.: 827,163

[22] Filed: Jan. 28, 1992

[30] Foreign Application Priority Data

Jan. 29, 1991 [DE] Fed. Rep. of Germany ....... 4102497

[51] Int. Cl.⁵ ................................................. B60T 8/34
[52] U.S. Cl. ................................. 303/113.4; 303/115.4
[58] Field of Search ................ 303/9.61, 25, 28, 113.1, 303/113.2, 113.3, 113.4, 116.1, 115.1, 115.4; 364/426.02

[56] References Cited

U.S. PATENT DOCUMENTS

4,753,490 6/1988 Belart et al. .................... 303/115.4
5,158,343 10/1992 Reichelt et al. ................. 303/113.3

FOREIGN PATENT DOCUMENTS

3444827 6/1986 Fed. Rep. of Germany .
2169370 7/1986 United Kingdom .
2173269 10/1986 United Kingdom .

*Primary Examiner*—Robert J. Oberleitner
*Assistant Examiner*—Lee W. Young
*Attorney, Agent, or Firm*—Evenson, McKeown, Edwards & Lenahan

[57] ABSTRACT

A hydraulic twin-circuit brake system for a road vehicle with front axle/rear axle brake circuit division, is equipped both with an anti-lock brake system (ABS) and an acceleration skid regulation device (ASR) which operates on the principle of slowing down a driven vehicle wheel tending to spin by activating its wheel brake. A brake pressure control device analogous to the acceleration skid regulation device is also provided for the brake circuit of the non-driven front wheels of the vehicle. This brake pressure control device, together with the acceleration skid regulation device for the driven rear wheels of the vehicle, is activated in the sense of an automatic brake pressure control when the driver actuates the brake pedal at a rate which is larger than a specified threshold value $\dot{\phi}_s$. The brake pressure is then automatically controlled such that optimum vehicle deceleration occurs. Buffer reservoirs which are connected to the outlet pressure spaces of the brake unit, instead of to the wheel brakes, during automatic braking achieve a pedal displacement simulation by way of which an electronic control unit recognizes the vehicle deceleration which the driver wishes to select by the brake pedal actuation.

21 Claims, 4 Drawing Sheets

BRAKE PRESSURE CONTROL DEVICE

BACKGROUND AND SUMMARY OF THE INVENTION

The present invention concerns a brake pressure control device for a road vehicle with hydraulic multi-circuit brake system, in particular a twin-circuit brake system with static brake circuits, into which brake system pressures proportional to the pedal force can be connected by pedal actuation of a brake unit, with an anti-lock brake system designed for dynamically stable deceleration behavior of the vehicle and with a sensor device recording the position of the brake pedal or of a brake unit element connected to the motion of the brake pedal, which sensor device generates electrical output signals characteristic of the instantaneous positions of the brake pedal.

It is possible to generate from the processing of the aforementioned output signals, via an electronic control unit in accordance with the present invention, control signals for an electrically controllable brake pressure setting device. The control of the setting device makes it possible to connect into the front wheel brakes, at least, a higher brake pressure than the expected brake pressure value associated with the instantaneous pedal position. Control of the brake pressure setting device in the sense of the increased brake pressure deployment is initiated at least whenever the speed $\dot{\phi}$ with which the pedal position changes during a brake pressure build-up actuation is greater than a specified threshold value $\dot{\phi}_s$. At least one buffer reservoir controllable, via a valve, by output signals of the electronic control unit is provided in accordance with the present invention and can be pressurized against a lower return force than that corresponding to a reaction force resulting from a reaction of the brake pressure on the brake unit.

A brake pressure control device is shown in DE 34 44 827 A1. A tandem main cylinder with hydraulic brake booster is the brake unit. The brake booster of the brake unit is a differential cylinder whose piston rod acts axially on the primary piston of the main cylinder, to whose primary outlet pressure space is connected to one brake circuit of the brake system. The primary outlet pressure space has an axially movable boundary formed by the primary piston and a secondary piston which also forms the axial boundary, movable on one side, of the secondary outlet pressure space of the tandem main cylinder. The second brake circuit of the brake system is connected to the secondary outlet pressure space of the tandem main cylinder.

A drive pressure space on the pedal side and a back pressure space on the main cylinder side have a pressure-tight boundary relative to one another formed by the booster piston. A brake valve which can be actuated by the brake pedal is integrated in the booster piston. The actuation of this brake valve permits a pressure proportional to the pedal force to be connected into the drive pressure space of the brake booster, which produces the amplification effect when, simultaneously, the back pressure space is relieved, via a relief valve, to the storage reservoir of the auxiliary pressure source from whose outlet pressure the booster drive pressure is derived by way of the brake valve.

A pressure modulator is also provided as the brake pressure control element configured as a static pressure converter which has an outlet pressure space permanently connected to the main brake pipe of the brake circuit supplied with brake pressure via the primary outlet pressure space and emerging from the primary outlet pressure space of the tandem main cylinder. In the outlet pressure space, a pressure increased relative to the control pressure can be applied to the connected brake circuit by pressurization of a control pressure space of the pressure converter. It is possible to connect, with valve control, the outlet pressure of the brake valve also present in the drive pressure space of the brake booster into this control pressure space. The piston of the pressure modulator is pressed by a return spring into its basic position associated with maximum volume of the outlet pressure space of the pressure modulator and is held in this position if and as long as the valve-controlled control pressure space is relieved of pressure.

The modulator piston is also pressed into its basic position by the pressure present in the primary outlet pressure space of the tandem main cylinder and therefore also present in the outlet pressure space of the pressure modulator. This pressure is monitored by a pressure transducer. The position of the booster piston, and thus also the position of the primary piston of the tandem main cylinder, is monitored by a displacement signal generator. A pedal position signal generator can be provided as an alternative to the piston position signal generator.

In the known brake pressure control device, the pedal displacement/brake pressure characteristic of the brake unit can be changed by the valve-controlled pressurization of the drive pressure space of the pressure converter. This does not, however, apply to the pedal force/brake pressure characteristic, and therefore also not to the boosting of the braking force because the reaction on the brake pedal resulting from a certain brake pressure is always the same regardless of whether the pressure modulator is or is not pressurized. The conventional brake pressure control device is therefore not suitable for applications or braking situations in which high braking forces are desirable even at low actuation forces, for example in a situation which demands full braking with high vehicle deceleration commencing as soon as possible, but nevertheless controllable.

Similar problems occur in another known brake pressure control device described in DE 35 11 535 A1 which also operates with a degree of boosting specified by the design of a hydraulic brake booster but which, in contrast to the brake pressure control device of DE 34 44 827 A1, is a brake system with dynamic brake circuits whose tandem main cylinder in normal braking operations, i.e. with intact brake booster, is only used for position selection. Brake fluid displaced from the main cylinder is accepted by a buffer reservoir provided for pedal displacement simulation, and the tandem main cylinder is used only for brake pressure generation in the case of a failed brake booster, in which case the brake circuits act as static brake circuits.

An object of the present invention is to provide a brake unit for a mode of operation which offers the possibility of changing the brake pressure/actuating force relationship as a function of how rapidly the driver actuates the brake pedal, in particular of increasing it when the driver actuates the brake system very rapidly.

This object has been achieved according to the present invention by a valve-controlled buffer reservoir be connected by an output signal of the electronic control unit activating the brake pressure setting device, to that pressure outlet of the brake unit which is associated with the brake circuit in which the increased level brake pressure deployment occurs and the brake unit outlet pressure space connected to the buffer reservoir is, under valve control, shut off from the brake circuit subjected to the increased brake pressure deployment, on actuation of the brake pressure control device.

It is thus possible to operate the brake system with different values of the brake pressure/actuation force relationship such that, for example initiated by a signal which is generated by the pedal actuation speed having exceeded a threshold value, a high brake pressure is already connected to the wheel brakes in the initial phase of a braking action, in the course of which only a small fraction of the actuation stroke of the brake pedal has been utilized. The further evolution of the high brake pressure is then controlled in relation to the further actuation of the brake pedal. As an example, it is maintained if the driver continues to actuate the brake pedal and is only reduced when the driver has let the brake pedal come back by a minimum amount. Even if, in such an automatic braking action, the maximum possible brake pressure is connected to the wheel brakes from the outset, there remains possible a pedal displacement which can be monitored and which is necessary for recognizing the driver's wishes. This is because brake fluid can continue to be displaced from the brake unit into the buffer reservoir in accordance with the present invention and the pedal feel appearing after the onset of automatic brake pressure control is substantially the same as in the case of a normal braking action so that the driver is not irritated by the automatically controlled transition to automatic brake pressure control.

It is desirable for the buffer reservoir acting, so to speak, as the displacement simulator to be provided for that brake circuit which accepts the larger brake fluid volume, i.e. for the front axle brake circuit in the case of a brake system with front axle/rear axle brake circuit division. The result of this is, of course, that the pedal displacement which can be used for the pedal "feel" is somewhat reduced. If, however, a buffer reservoir is provided for each of the two brake circuits, the complete pedal displacement can be also used for control of the brake pressure control device.

In a currently preferred embodiment of the brake pressure setting device, one or more buffer reservoirs are designed as return spring piston reservoirs. Such reservoirs can, in turn, be equipped with displacement sensors to record their piston displacements. These can be used to check the pedal displacement sensor and, in turn, can be used for sensing the driver's wishes. It is also possible to equip such reservoirs with preloading devices in order to set a spring preload particularly suitable for the driver and thereby t adjust the brake system to the stature of the driver.

If the particular buffer reservoir is provided with a preloading device which, while the brake pressure setting device is not actuated, keeps the preload of the reservoir spring to a value which corresponds to the force which results from the reservoir piston being subjected to the outlet pressure of the connected outlet pressure space of the brake unit, then, for example, a brake pedal is prevented from collapsing due to pressure accepted by the buffer reservoir in the case where the brake pressure control device is actuated while brake pressure has already been built up in the wheel brakes by a braking action initiated with low pedal force. Furthermore, a reduction in such a pedal reaction can be at least moderated simply by a preload provided from the outset by the buffer reservoir springs.

The collapse can be slowed, hence avoiding a frightening pedal reaction with pulsed shut-off of the buffer reservoir, by using pulse-controlled solenoid valves, from the particular outlet pressure space of the brake unit.

A preloading device is formed locating the reservoir spring between two pistons, one of which forms an axially movable boundary of the reservoir chamber while the second piston forms an axially movable boundary of a control pressure space into which a pressure corresponding to the pressure in the connected outlet pressure space of the brake unit is always connected. The outlet pressure of the brake unit appears fundamentally suitable for this purpose but could be problematic for safety reasons.

For such safety reasons, it may be more advantageous for the pressure follow-up in to the control pressure space of the buffer reservoir to take controlled by a pulse-controlled follow-up valve for connection of either the outlet pressure of the auxiliary pressure source or this control pressure space to the unpressurized storage reservoir of the auxiliary pressure source. In principle, such control is possible by 3/2 solenoid valves which hav a basic position in which the control pressure space is connected to the storage reservoir of the auxiliar pressure source and is shut off against its high pressure outlet and which have an excited position in which the outlet pressure space is connected to the high pressure outlet of the auxiliary pressure source but is shut off against the storage reservoir thereof.

It is more advantageous, however, for such a follow-up valve to be a 3/3-way solenoid valve which ca be driven by a first control signal (with a relatively low control current strength of, for example, 3 A) from its basic position 0, in which the control pressure space is connected to the storage reservoir of the auxiliary pressure source and is shut off from the latter's high pressure outlet, into a first excited position I (i.e. a shut-off position) in which the control pressure space is shut off from both the high pressur outlet of the auxiliary pressure source and its storage reservoir, and which can be driven by a control signal (with relatively higher control current strength of, for example, 6 A) into a second excited position II, in which the control pressure space of the buffer reservoir is connected to the high pressure outlet of the auxiliary pressure source and is shut off from its storage reservoir.

In one currently preferred configuration of the brake pressure control device for a brake system with front axle/rear axle brake circuit division, at least one pressure sensor generates an electrical output signal characteristic of the pressure in the outlet pressure space, of the brake unit, associated with the front axle brake circuit I, and at least one pressure sensor generates an electrical output signal characteristic of the pressure in at least one of the front wheel brakes. By using the output signals of these sensors, it is then possible in a simple way to make a comparison between the brake unit outlet pressure, as the required value for the front axle brake circuit, and the pressure prevailing in this circuit in order to achieve an appropriate control of the pressure connection into the control pressure space of the pressure modulator with follow-up spring preload.

The same is possible in the case of brake systems with any given brake circuit division if, for each outlet pressure space of the brake unit, a pressure sensor is provided which generates an output signal characteristic of the particular outlet pressure and at least one pressure sensor is associated with each of the brake circuits I and II.

A particularly simple type of control for the pressure connection into the control pressure spaces of the pressure modulators is then also possible if a pressure sensor recording the pressure in the control pressure space of the particular pressure modulator and a pressure sensor recording the pressure in the connected outlet pressure space of the brake unit are provided.

In a preferred configuration of the brake pressur control device, at least one pressure modulator is provided as the brake pressure setting element of the brake pressure control device. In this pressure modulator, a piston forms a movable pressure-tight boundary between a control pressure space and an outlet pressure space. When the control pressure space is subjected to the valve-controlled outlet pressure of the auxiliary pressure source, the piston can be displaced in the direction of a brake pressure build-up in the brake circuit connected to the outlet pressure space. By way of valve-controlled connection of the control pressure space to the storage reservoir of the auxiliary pressure source, the piston can be displaced in the direction of a pressure reduction in the connected brake circuit. Furthermore, the piston is driven by a preloaded, spring-elastic return element into its basic position corresponding to minimum volume of the control pressure space or maximum volume of the outlet pressure space.

In this case, it is again particularly advantageous for control pressure deployment if brake pressure control valves provided for connecting the control pressure space of the particular pressure modulator to the high pressure outlet of the auxiliary pressure source or, alternatively, to its storage reservoir, are 3/3-way solenoid valves, whose basic position 0 is a flow position shutting off the control pressure space of the particular pressure modulator from the high pressure outlet of the auxiliary pressure source but connecting it to the storage reservoir. Their firs excited position I, taken up on excitation of the control magnets by a control signal of relatively low control current strength of, for example, 3 A, is a shut-off position in which the control pressure space is shut off from both the high pressure outlet of the auxiliary pressure source and its storage reservoir. The second excited position II of the 3/3-way solenoid valves, taken up on excitation of their control magnets by a control signal of relatively higher excitation current strength of, for example, 6 A, is again a flow position in which the control pressure space of the pressure modulator is connected to the high pressure outlet of the auxiliary pressure source but is shut off from its storage reservoir.

Such valves are also suitable as function control valves of the brake pressure control device if their basic position 0 is a flow position shutting off the particular outlet pressure space of the brake unit from the reservoir chamber of the buffer reservoir but connecting it to the continuing section of the main brake pipe of the particular brake circuit. These valves, on excitation of their control magnets by a control current of relatively low control current strength of, for example, 3 A, take up a first excited position I (i.e. a shut-off position) in which the outlet pressure space of the brake unit is shut off from both the reservoir chamber of the particular buffer reservoir and the continuing main brake pipe section and on excitation of their control magnet by a relatively higher control current strength of, for example, 6 A, take up a second excited position II, which is again a flow position, in which the outlet pressure space of the brake unit is connected to the reservoir chamber of the particular buffer reservoir but is shut off from the continuing main brake pipe section.

Because the function control valves remain held in the position provided for this purpose during their activation period (a position in which the particular outlet pressure space of the brake unit is connected to the associated buffer reservoir) once the brake pressure control device has responded, these valves can also be two-position valves, i.e. as 3/2-way solenoid valves which only have alternative flow positions and can therefore be switched from one flow position to the other by a single control signal of defined control current strength. This permits simplification of the position selection.

Such a 3/2-way solenoid valve with simple position selection can be replaced by an even simpler 2/2-way solenoid valve and an hydraulically controlled, additional 2/2-way valve if the particular pressure modulator whose outlet pressure space is connected to the brake pipe section continuing to the anti-lock brake system or to the wheel brakes of the particular brake circuit I or II is connected to the pressure outlet of the brake unit via a valve. The basic position of this valve is a flow position connecting the pressure outlet of the brake unit (in the basic position of the modulator piston) to the outlet pressure space of the pressure modulator. Controlled by the motions of the modulator piston, the valve reaches its shut-off position after a small fraction of the pressure build-up stroke of the modulator piston, and is brought back to its open position by a return of the modulator piston to its basic position. A pressure modulator configured in such a way is analogous with the construction and function of a single-circuit main cylinder in which the pressure-controlled or displacement-controlled 2/2-way valve can be brought about either by providing a follow-up hole which can be shut off or connected by the piston motions from or to the pressure outlet of the brake unit or by providing a central valve integrated in the piston of the pressure modulator can be provided as is already known from conventional main cylinders.

The above described embodiments the brake pressure control device in accordance with the present invention can be constructed as an additional unit to an otherwise conventional motor vehicle brake system. If required, the vehicle can be equipped with this unit as a retrofit item. In the case, however, of vehicles which are to be equipped from the outset with an anti-lock brake system, an acceleration skid regulation device (ASR) and possibly also with a device for the electronic control of a more or less ideal front axle/rear axle brake force distribution, it is also desirable to integrate, again from the outset, the brake pressure control device according to the present invention into such a complex feed-back and open-loop control system, i.e. by using the components already available for the anti-lock brake system and the acceleration skid regulation device. This is possible in a simple manner in that a device analogous to the acceleration skid regulation device for the driven vehicle wheels is provided in order to subject the brake circuit of the non-driven vehicle wheels to brake pressure. The brake pressure control can be achieved by control of the analogous device as a function of the brake pedal position and its changes.

In a vehicle with front axle/rear axle brake circuit division, rear wheel drive and an acceleration skid regulation device (in which the return pump of the rear axle brake circuit is used as the auxiliary pressure source, a booster pump being provided to supply it with brake fluid), the brake pressure control device can be simply implemented by also connecting a booster pump upstream of the return pump of the front axle brake circuit and by providing, in addition to the hydraulic unit of this feed-back and open-loop control system, a subsidiary hydraulic unit. This subsidiary hydraulic unit includes the two buffer reservoirs and the function control valves of the brake pressure control subsidiary unit, which are 2/2-way solenoid valves provided for connecting the buffer reservoirs to and shutting them off from the outlet pressure spaces of the brake unit.

BRIEF DESCRIPTION OF THE DRAWINGS

These and further objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
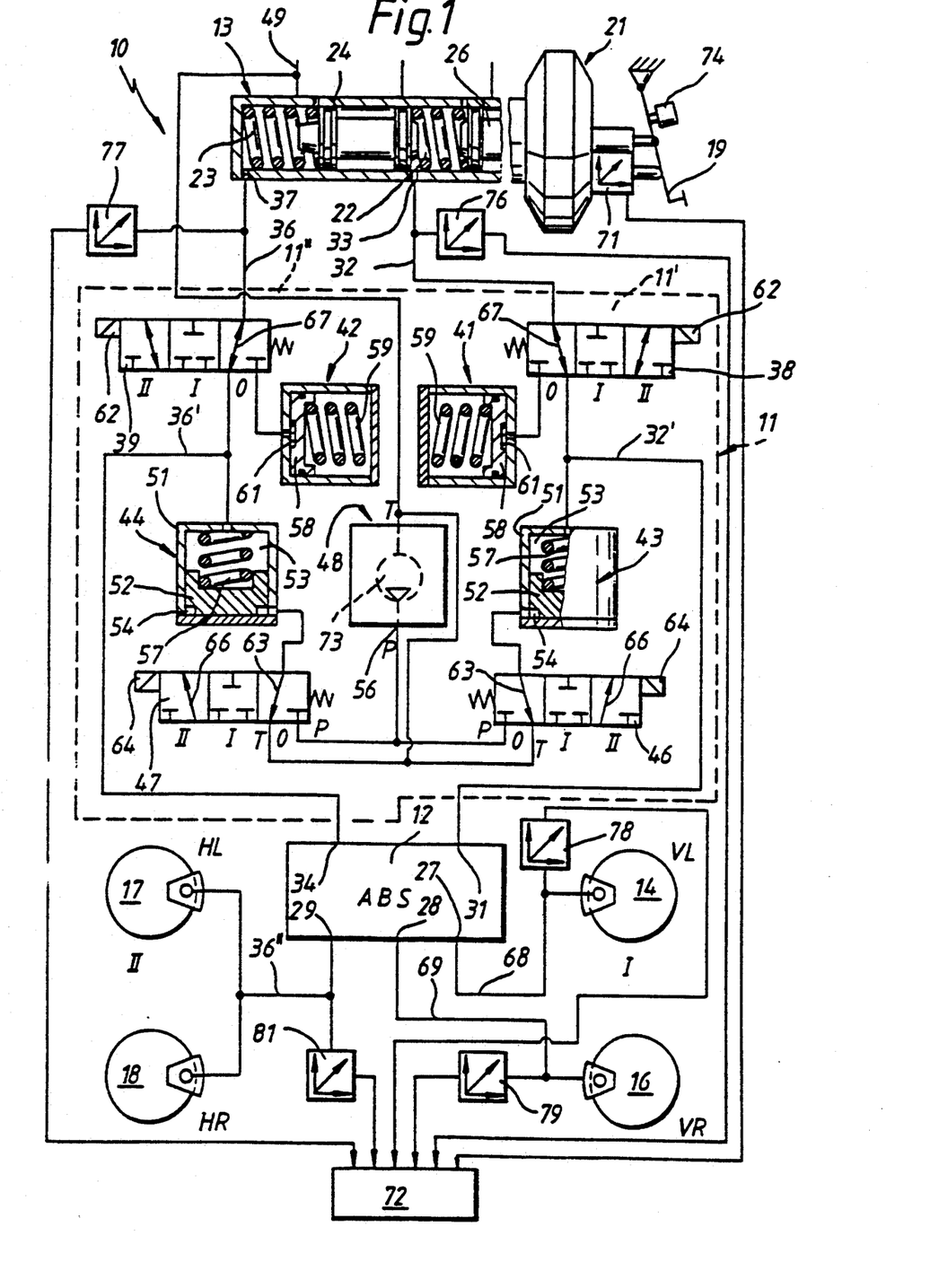
FIG. 1 is a schematic electro-hydraulic block circuit diagram of a hydraulic twin-circuit brake system of a road vehicle which is equipped with an anti-lock brake system in which, between the anti-lock brake system and the brake unit, a brake pressure control device in accordance with the present invention, is provided with simple return spring piston reservoirs as the buffer reservoirs.

Now referring to FIG. 1, a hydraulic twin-circuit brake system of a road vehicle represented by it is indicated generally by numeral 10. The road vehicle is equipped with a brake pressure control device in accordance with the present invention indicated generally by numeral 11, whose purpose is to recognize, from the way in which the driver actuates the brake system 10, whether that driver wishes to achieve a braking objective which can be achieved with moderate vehicle deceleration or wishes to achieve full braking with the greatest possible vehicle deceleration. Reacting, as it were, to the particular driver's wish, the purpose of the brake pressure control device is then automatically to control the deployment of an appropriately high braking force which the driver could not select or could not select rapidly enough simply by actuation of the brake system 10, i.e. without the additional braking force control device 11.

Figure 2:
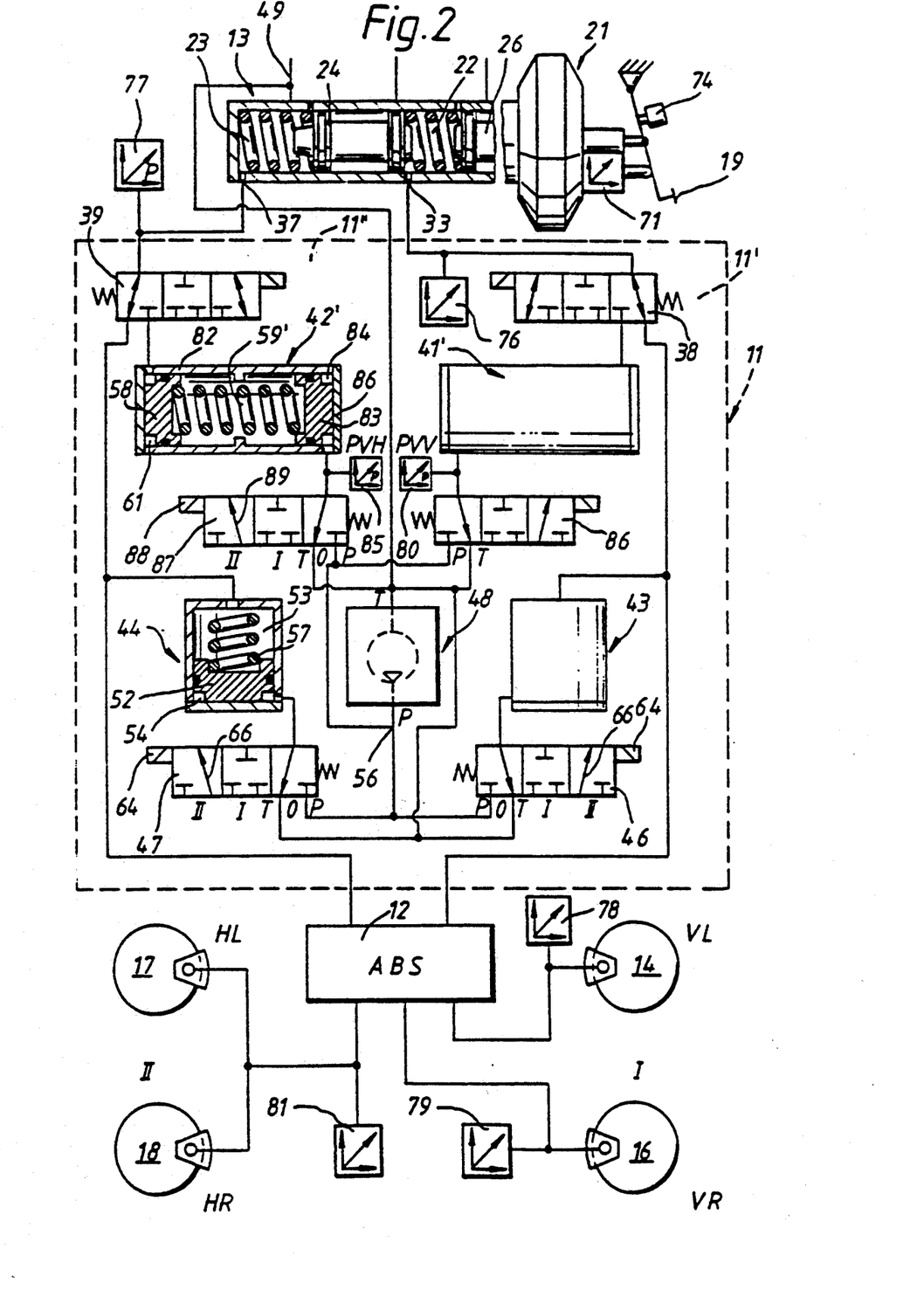
FIG. 2 is a schematic view similar to FIG. 1 in which, as part of the brake pressure control device, buffer reservoirs are provided with spring preloading of the reservoir springs in relation to the outlet pressur of the brake unit.
Figure 3:
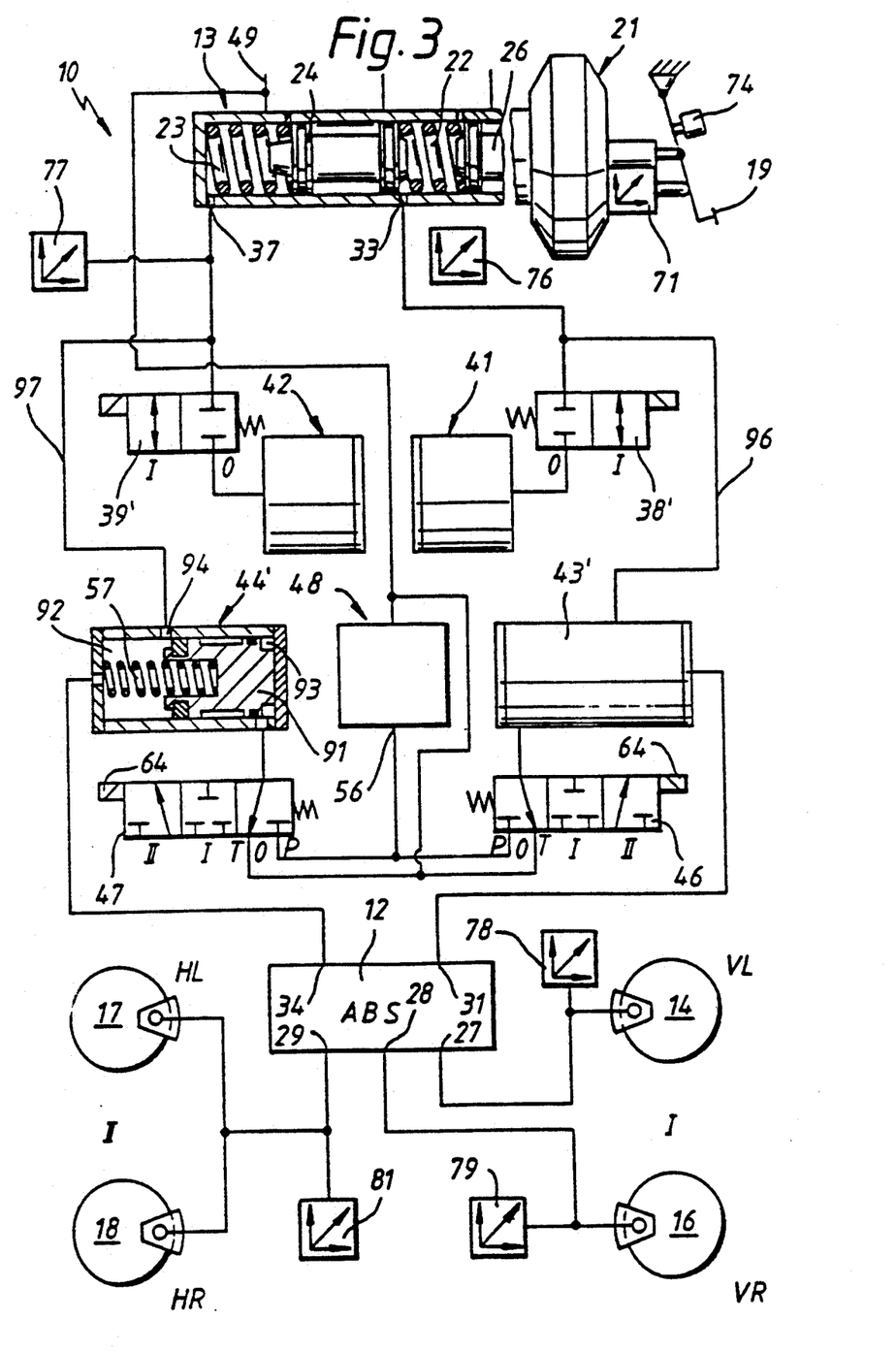
FIG. 3 is another schematic view of yet another embodiment in which, as part of the brake pressure control device, pressure modulators are provided as brake pressure setting elements and are single-circuit main cylinders in which suitable, displacement-controlled 2/2-way valves are integrated for shutting off the outlet pressure spaces of these pressure modulators from the brake unit.

In the embodiments of FIGS. 1–3, the brake pressure control device 11 is configured as a device additional to a twin-circuit brake system which may otherwise be considered as conventional but which is, however, also equipped with an anti-lock braking system 12, indicated only diagrammatically in FIGS. 1 to 3. In this system 12, it is assumed, only for the purpose of explanation and not to limit the present invention, that it is also made to operate on the recirculation principle in which, in brake pressure reduction phases of the anti-lock brake control, brake fluid drained from a wheel brake subject to the control is pumped back into the main brake pipe of the brake circuit on which the control is activated or into an outlet pressure space, associated with this brake circuit, of the brake unit 13 of the brake system 10. The conventional anti-lock brake system 12 is assumed to be known with respect to construction and function and is therefore not explained in further detail.

As part of the brake system 10, the front wheel brakes 14 and 16 are combined in a static front axle brake circuit I, and the rear wheel brakes 17 and 18 are combined in a similarly static rear axle brake circuit II.

In the embodiments shown, a tandem main cylinder of conventional configuration is provided in each case as the brake unit 13. This tandem main cylinder can be actuated by a brake pedal 19 via a hydraulic or pneumatic brake booster 21, and has a primary outlet pressure space 22 associated with the front axle brake circuit I and a secondary outlet pressure space 23 associated with the rear axle brake circuit II. These outlet pressure spaces have a pressure-tight and movable boundary relative to one anothe formed by the floating piston 24 of the tandem main cylinder 13. The second axial boundary of the primary outlet pressure space 22 of the tandem main cylinder 13 is formed by the tandem main cylinder's pressure rod piston 26, which is acted upon by the actuating force, as increased by the pedal transmission ratio and boosted by the brake booster 21.

In the embodiments of FIGS. 1 to 3, it is also assumed that the vehicle has rear-axle drive, with the anti-lock brake system 12 operating on the rear wheel brakes 17 and 18 with common brake pressure con&.rol in accordance with the select-low principle and on the brake circuit I of the front wheels with individual wheel control such that brake pressure can also be reduced and built up again in "antiphase" on its wheel brakes 14 and 16.

The construction of the anti-lock brake system 12 is such that it has a pressure outlet 27 associated with the left-hand front wheel brake 14 and a pressure outlet 28 associated with the right-hand front wheel brake 16 but only one pressure outlet 29 associated with the two rear wheel brakes 17 and 18, at which are provided the brake pressures, controlled if necessary, for the wheel brakes 14, 16 and 17, 18. The anti-lock brake system 12 also has, associated with the front axle brake circuit I, a brake pressure inlet 31 which, in a conventional brake system of the type considered, is directly connected via the main brake pipe 32 of the front axle brake circuit I to the pressure outlet 33, associated with this brake circuit I, of the primary outlet pressure space 22 of the brake unit 13 and, associated with the rear axle brake circuit II, a pressure inlet 34 which, in a conventional brake system, is connected via the main brake pipe 36 of the rear axle brake circuit II directly to the pressure outlet 37, associated with the latter, of the secondary outlet pressure space 23 of the brake unit 13.

The brake pressure control unit 11 is subdivided into two subsidiary units 11' and 11" which are each associated with one of the two brake circuits I and II, respectively. The subsidiary unit 11' forms, so to speak, a section of the main brake pipe 32, of the brake system 10, leading from the pressure outlet 33 of the brake unit 13 to the pressure inlet 31, associated with the front axle brake circuit I, of the anti-lock brake system 12. The subsidiary unit 11" forms a section of the main brake pipe 32, or of the main brake pipe 36, respectively, of the brake system 10, leading from the pressure outlet 37, associated with the rear axle brake circuit II, of the brake unit 13 to the corresponding pressure inlet 34 of the anti-lock brake system 12.

The two subsidiary units 11' and 11" each respectively include, in the electro-hydraulic circuit arrangement which can be seen in FIG. 1, a function control valve 38 or 39, a buffer reservoir 41 or 42 which can be connected, via the relevant function control valve 38 or 39, to the pressure outlet 33 or 37, of the brake unit 13 associated with the front axle brake circuit I or the rear axle brake circuit II, and which can be used for pedal displacement simulation, a pressure modulator 43 or 44 which are each individually connected to the pressure inlet 31 of the anti-lock brake system 12 associated with the front axle brake circuit I or, respectively, to the pressure inlet 34 of the anti-lock brake system 12 associated with the rear axle brake circuit.

The two subsidiary units 11. and 11" each also respectively include, in the electro-hydraulic circuit arrangement which can be seen in FIG. 1, a brake pressure control valve 46 or 47, via which brake pressure build-up, brake pressure retention and brake pressure reduction phases, attainable with the aid of the pressure modulators 43 and 44 in the front axle brake circuit I and the rear axle brake circuit II, can be controlled. An auxiliary pressure source 48 operates at the high outlet pressure level of, for example, 200 bar and is used by both subsidiary units 11' and 11" of the brake pressure control device 11. This auxiliary pressure source 48 is operated with brake fluid as the working medium in the embodiments shown and is accordingly connected on its suction side to the storage reservoir 49 of the brake unit 13.

Apart from the sizing of the two buffer reservoirs 41 and 42 and of the pressure modulators 43 and 44, the two subsidiary units 11' and 11" are of identical configuration and are completely analogous in function. It is therefore sufficient for one of ordinary skill in this art to understand the function of the present invention to explain, in detail, only the construction of the subsidiary unit 11" associated with the rear axle brake circuit II.

The pressure modulator 44 is constructed as a 1/1 pressure converter which has a cylindrical housing 51 within which an outlet pressure space 53 is filled with brake fluid and has an axially movable boundary with respect to a control pressure space 54. The axially movable boundary is formed by a pressure-tight displaceable modulator piston 52. By subjecting the control pressure space 54 to the outlet pressure provided at the pressure outlet 56 of the auxiliary pressure source 48, under the control of the brake pressure control valve 47, a pressure can be built up in the outlet pressure space 53 of the pressure modulator 44 which—via the anti-lock braking system 12, can be connected into the rear wheel brakes 17 and 18 of the vehicle. The modulator piston 52 of the pressure modulator 44 is pressed by a preloaded return spring 57, e.g. as a helical spring into its basic position shown in Fi9. 1, which basic position is associated with maximum volume of the outlet pressure space 53.

The outlet pressure space 53 of the pressure modulator 44 is permanently connected to a main brake pipe section 36' which, in turn, connects the outlet pressure space 53 to the pressure inlet 34 of the anti-lock brake system 12 associated with the rear axle brake circuit II. The outlet pressure space 53 can be shut off from the main brake pipe 36 of the rear axle brake circuit II by way of the function control valve 39 of the subsidiary unit 11". The main brake pipe 36 begins at the pressure outlet 37 of the secondary outlet pressure space 23 of the brake unit 13. The buffer reservoir 42 of the subsidiary unit 11" of the brake pressure control device 11 associated with the rear axle brake circuit II is configured as a return spring piston reservoir whose piston 58 is pressed into the basic position associated with the minimum volume of its reservoir chamber 61 by a reservoir spring 59, shown, for example, as a helical spring. The function control valve 39 is connected between the pressure outlet 37 of the secondary outlet pressure space 23 of the brake unit (or the main brake pipe 36 of the rear axle brake circuit II) and the buffer reservoir 42 of the subsidiary unit 11" of the brake pressure control device 11 associated with the rear axle brake circuit II.

The function control valve 39 is configured as a 3/3-way solenoid valve whose basic position 0 is a function position in which the pressure outlet 37 of the secondary outlet pressure space 23 of the brake unit 13 is connected, via the main brake pipe 36 of the brake unit 13 and the main brake pipe section 36', to the pressure inlet 34 of the anti-lock brake system 12 associated with the rear axle brake circuit II and, by way of the anti-lock brake system 12, to the two rear wheel brakes 17 and 18 (in any case where the braking action is not subject to the anti-lock control. In this basic position 0, the buffer reservoir 42 is shut off from the pressure outlet 37 of the brake unit 13 associated with the rear axle brake circuit II.

Excitation of control magnet 62 by way of a first control signal of defined control current strength (of, for example, 3 A) drives the associated function control valve 39 into a first excited position I in which the pressure outlet 37 of the secondary outlet pressure space 23 of the brake unit 13 is shut off from both the reservoir chamber 61 of the buffer reservoir 42 and the section 36' of the main brake pipe of the rear axle brake circuit II leading on from the function control valve 39 to the pressure inlet 34, of the anti-lock brake system 12 associated with the rear axle brake circuit II. A second control signal of defined, higher current strength than the first control segment (of, for example, 6 A) drives the function control valve 39 of the subsidiary unit 11" into a second, excited position II in which the pressure outlet 37 of the secondary outlet pressure space 23 of the brake unit 13 is connected to the reservoir chamber 61 of the buffe reservoir 42 of the subsidiary unit 11" but in which it is shut off form the section 36', of the main brake pipe of the rear axle brake circuit II leading on from the function control valve 39 to the pressure inlet 34, of the anti-lock brake system 12 associated with the rear axle brake circuit II.

The brake pressure control valve 47 of the subsidiary unit 11″ of the brake pressure control unit 11 associated with the rear axle brake circuit II is also configured as a 3/3-way solenoid valve which has a basic position 0 in which the high pressure outlet 56 of the auxiliary pressure source 48 is shut off from the control pressure space 54 of the pressure modulator 44, but this control pressure space 54 is connected, via a first flow path 63 of the brake pressure control valve 47 to the unpressurized (i.e. at atmospheric pressure) brake fluid storage reservoir 49 of the brake unit 13. Excitation of the control magnet 64 of the brake pressure control valve 47 of the subsidiary unit 11″ of the brake pressure control device 11 by way of a first control signal of defined, relatively low control current strength (of again, for example, 3 A) drives the brake pressure control valve of the subsidiary unit 11″ into a shut-off (first excited) position I in which the control pressure space 54 of the pressure modulator 44 is shut off from both the brake fluid storage reservoir 49 of the brake unit 13 and the high pressure outlet 56 of the auxiliary pressure source 48.

Excitation of the control magnet 64 of the brake pressure control valve 47 of the subsidiary unit 11″ of the brake pressure control device 11 associated with the rear axle brake circuit II by way of a second control signal of defined higher control curren strength than the first control signal (of, for example, 6 A) switches the brake control valve 47 into a second, excited function position II in which, via a second flow path 66 of the brake pressure control valve 47, the control pressure space 54 of the pressure modulator 44 is connected to the high pressure outlet 56 of the auxiliary pressure source 48 but is shut off from the unpressurized storage reservoir 49 of the brake unit 13.

The subsidiary unit 11′ of the brake pressure control device 11 associated with the front axle brake circuit I is completely analogous to the subsidiary unit 11″ of the brake pressure control device 11 associated with the rear axle brake circuit II both with respect to the construction and function of its individual components and with respect to its inclusion in the circuit between the pressure outlet 33 of the primary outlet pressure space 22 of the brake unit 13 and the pressure inlet 31 of the anti-lock brake system 12 associated with the front axle brake circuit I. To this extent, therefore, the same reference numerals are used to designate elements of the pressure modulator 43, the buffer reservoir 41, the function control valve 38 and the brake pressure control valve 46 of the subsidiary unit 11′ as were used to designated and described in detail above corresponding elements of the subsidiary unit 11″. Accordingly, further descriptions of similarly constructed and functioning parts is hereby dispersed with.

In the illustrated basic positions the function control valves 38, 39, the pressure outlets 33 and 37 of the brake unit 13 are directly connected via a flow path 67 of the function control valves 38 and 39, respectively, to the associated pressure inlets 31 and 34 of the anti-lock brake system 12 or, should such a system not be provided, directly to the brake pipe branches 68, 69, respectively, leading onto the individual wheel brakes 14 and 16 or to the section 36″ of the main brake pipe of the rear axle brake circuit II branching off to the rear wheel brakes 17 and 18. The brake system 10 thus operates as a "normal" brake system in which the brake pressure in the wheel brakes, due to elasticity of the brake pipes 32 and 36 and friction losses in the wheel brake cylinders and the like, follows, with a not insubstantial time delay, the pressures which are built up in the primary outlet pressure space 22 and the secondary outlet pressure space 23 of the brake unit 13 by actuation of the brake pedal 19.

In addition to the normal mode of operation of the brake system 10 heretofore described, the brake pressure control device 11 also permits a mode of operation of the type where the brake pressure, which is connected into the front wheel brakes 14 16 and into the rear wheel brakes 17, 18, occurs via the brake pressure control device 11. In this mode of operation, the brake unit 13 is "only" used as a required value control unit whose actuation permits the driver's wish as to how braking should take place to be, so to speak, "unrecognized". For this purpose, the brake unit 13 is equipped with an electronic or electromechanical position sensor 71 which generates electrical output signals which are a direct measure, in terms of level and/or frequency, of the instantaneous position of the brake pedal 19 and/or the position of the primary piston 26 of the brake unit 13 and therefore also (assuming correct functioning of the brake urit 13) of the position of the secondary piston 24 of the brake unit 13.

Such a position sensor 71, shown in FIGS. 1 to 3 in a diagrammatically simplified manner as a pedal position sensor, can be brought about as an inductive or capacitive sensor (but also can be configured as a rotary potentiometer or a linear resistance signal generator) whose output signal varies sinusoidally or linearly with the brake pedal position or the position of the primary piston 26 of the brake unit. The only essential point is that the output signals of this position sensor 71 can be unambiguously associated with correlated positions of the brake pedal 19 and/or the primary piston 26 so that processing of the position sensor output signals, which are supplied to an electronic processing and control unit 72, permits these signals to be evaluated in units of the brake pedal position and/or the position of the primary piston 26 of the brake unit 13 and of changes to those positions. It is therefore also possible to evaluate these signals in terms of the expected value of a brake pressure or of a brake force which the driver wishes to achieve. From this evaluation, i.e. from the processing of these position sensor output signals, the electronic control unit 72 can generate control signals for driving the function control valves 38, 39, the brake pressure control valves 46, 47 and, if required, a pump 73 of the auxiliary pressure source 48. By way of these control signals, these electrically controllable components of the brake pressure control device 11 can have their positions selected such that, for example, a brake pressure deployment is achieved in the wheel brakes 14, 16 and 17, 18 of the front wheel brake circuit I and the rear axle brake circuit II, respectively. This deployment corresponds to the driver's wishes recognizable by the position sensor 71, and is thus appropriate to the situation to the greatest extent possible.

An explanation of further variants of a sensor arrangement suitable for recognizing and/or checking the driver's wishes is described below but first a frequently occurring braking situation is used to explain the function of the brake pressure control unit 11, including the position sensor 71 and the electronic control unit 72.

A traffic situation is assumed in which braking with a high level of vehicle deceleration is necessary, for example when overtaking at high speed on the motorway has to be interrupted because a substantially slower vehicle moves out ahead into the overtaking lane. In this situation, the driver has to actuate the brake pedal 19 rapidly and with substantial pedal force.

By differentiation processing of the corresponding rapidly changing position sensor 71, the electronic control unit 72 recognizes the fact that braking is necessary. As soon as a threshold value $\dot{\phi}_s$ of the rate of position change of the brake pedal 19 is exceeded, the control unit 72 generates output signals so that the function control valves 38, 39 are initially driven into their shut-off function position I and immediately afterwards into their function position II, in which the outlet pressure spaces 22, 23 of the brake unit 13 are shut off from the continuing sections 32' and 36' of the main brake pipes 32 and 37, respectively, of the brake system 10 but are connected to the reservoir chambers 61 of the buffer reservoirs 41, 42. Simultaneously with the switching over of the function control valves 38, 39 into their shut-off function positions I, the auxiliary pressure source 48 is actuated. Simultaneously or, at the latest, when the function control valves 38, 39 are switched over into their function position II, the brake pressure control valves 46, 47 are also switched over into their function positions II in which the high pressure outlet 56 of the auxiliary pressure source 48 is connected to the control pressure spaces 54 of the pressure modulators 43, 44 so that their pistons 52 experience a displacement in the direction of a pressure build-up in the outlet pressure spaces 53.

The pressure built up in these outlet pressure spaces 53 is directly connected, via the anti-lock brake system 12, into the wheel brakes 14, 16 and 17, 18 of the front axle brake circuit I and the rear axle brake circuit II, respectively. In this introductory phase of the braking action, the control pressure spaces 54 of the pressure modulators are subjected rapidly to the high outlet pressure of the auxiliary pressure source 48 and until the brake pressure appearing in the wheel brakes 14, 16 and 17, 18 of the two brake circuits I and II, respectively reaches the brake pressure characteristic of maximum vehicle deceleration of, for example, 150 bar. This occurs whether or not the driver wishes to select a brake pressure up to a maximum in the brake system 10.

The auxiliary pressure source 48 is configured such that connecting its outlet pressure into the control pressure spaces 54 of the pressure modulators 43, 44 gives a rate of increase of the brake pressure in the wheel brakes 14, 15 and 17, 18 which is greater than the brake pressure which a driver of average strength could achieve by pedal actuation of the brake system 10. In the function positions II of the function control valves 38 and 39, the pressure outlets 33 and 37 of the brake unit 13 are respectively connected to a reservoir chamber 61 of one of the buffer reservoirs 41, 42 which can accept brake fluid displaced from the primary outlet pressure space 22 and the secondary outlet pressure space 23, respectively, of the brake unit 13. Because of this connection of the pressure outlets the driver can continue to actuate the brake pedal 19 in the direction of a pressure build-up displacement of the main cylinder pistons 24, 26 and the reaction which can be felt at the brake pedal 19 now corresponds to the forces which are deployed by the return springs 59 of the buffer reservoirs 41, 42 when their pistons 58 are displaced by these springs in the reservoir chambers 61. The return springs 59 of the buffer reservoirs 41 and 42 are so configured and sized that the reaction force acting on the brake pedal 19 in this operating condition of the brake system 10 is lower than that in a braking situation in which, because the driver has actuated the brake pedal 19 slowly, the brake pressure control device 11 has not been actuated.

However, in a vehicle operational situation selected to explain the brake pressure control device 11, in which the return forces acting on the brake pedal 19 and opposing the actuating force are lower, it is therefore possible for the driver, depending on his assessment of the traffic situation, to depress the brake pedal 19 more easily and therefore to select more rapidly the brake pressure required values, which are, in the driver's opinion, necessary. In every case, the output signal of the position sensor 71, which signal is characteristic of position, is a direct measure of the brake pressure required values and it is by means thereof that the electronic control unit 72 of the brake pressure control device 11 recognizes the driver's wishes.

If the driver actuates the brake pedal 19 at a rate $\dot{\phi}$ which is smaller than the response threshold value $\dot{\phi}_s$ of the brake pressure control device 11 but still in the direction of a pressure build-up, the electronic control unit 72 evaluates this to the effect that the vehicle deceleration now corresponds to the driver's wishes. It now automatically makes the brake pressure present in the wheel brakes 14, 16 and 17, 18 equal to a value corresponding to the brake pedal position or particular piston position of the brake unit 13 in a normal braking action, i.e. one not subjected to a brake pressure control of the above type. This generally requires a pressure reduction in the wheel brakes 14, 16 and 17, 18 and takes place by the brake pressure control valves being switched (preferably pulsed) between their function positions I and 0 so that there is a stepwise reduction of pressure whose rate of change can be determined by appropriate variation of the control periods during which the brake pressure control valves 46, 47 are alternately switched into their shut-off position I and their basic position 0. During such pressure reduction phases, the function control valves 38, 39 can be held in their function positions II in which a continuous recording of the driver's wishes continues to be possible by way of the position sensor 71.

In the course of brake pressure control, a maximum value $P_{max}$ may be reached which corresponds to maximum vehicle deceleration when the highest possible friction coefficient is used between the road surface and the braked vehicle wheels, or a value $P_{reg}$ signalled when an anti-lock brake system 12 responds, this value being now limited or reduced by the anti-lock brake system in order to ensure dynamically stable behavior of the vehicle motion. It is then desirable for the function control valves 38, 39 to be switched into their shut-off function position I on the occurrence of this situation so that the brake pedal 19 becomes "hard", i.e. it can no longer be moved in the direction of a brake pressure build-up actuation because brake fluid can now no longer be displaced from the outlet pressure spaces 22 and 23 of the brake unit 13 into the buffer reservoirs 41 and 42. This provides the driver with an obvious signal that a further increase in brake pressure is no longer sensible and is, furthermore, being prevented by the anti-lock brake system 12 in combination with the brake pressure control system 11. As long as the driver keeps the brake pedal 19 in the position reached in this manner, the function control valves 38, 39 are also held in their shut-off positions I and the brake pressure is kept, by the brake pressure control device 11 in combination with the anti-lock brake system 12, at the highest possible value which is currently still compatible with adequate dynamic stability of the vehicle. In this case, the latter value corresponds to optimum vehicle deceleration and, therefore, to the shortest possible braking distance.

As soon as the driver withdraws the brake pedal 19, this is recognized by the electronic control unit 72, again from the output signal of the position sensor 71 and the direction in which this signal changes. As a result, the function control valves 38, 39 are initially switched back into their function position II connecting the outlet pressure spaces 22, 23 of the brake unit 13 to the buffer reservoirs 41, 42 and, by appropriate selection of the position of the brake pressure control valves 46, 47, the brake pressures in the front wheel brakes 14, 16 and the brake pressures in the wheel brakes 17, 18 of the rear axle are adjusted to values corresponding to the positions of the brake unit pistons 24, 26 recorded directly and indirectly by the position sensor 71. The function control valves 38, 39 are held in their function positions II corresponding to brake pressure control operation.

Once the brake pressure control device 11 has responded during a braking action, it remains actuated as long as the output signal of the brake light switch 74 of the brake system 10 has it signal level characteristic of brake actuation and only after this level has fallen is the brake pressure control device 11 switched off. Thereafter, the function control valves 38, 39 and the brake pressure control valves 46, 47 resume their illustrated basic positions, the same applying to the pistons 58 of the buffer reservoirs 41, 42 and the pistons 52 of the pressure modulators 43, 44.

It is not necessary to explain the circuitry of the electronic control unit 72 which generates, from the processing of the output signals of the position sensor 71, the control signals necessary for the operation of the above described brake pressure control device 11 to control the function control valves 38, 39, the brake pressure control valves 46, 47 and the auxiliary pressure source because the electronic control unit 72 can be appropriately brought about by one of ordinary skill using conventional electronic circuitry means given the purpose of the unit as herein described.

This also applies when the electronic control unit 72 has to be constructed for processing output signals of further sensors, such as, for example, pressure sensors 76, 77 which generate output signals characteristic of the pressure respectively present in the primary outlet pressure space 22 and in the secondary outlet pressure space 23 of the brake unit 13, and/or further pressure sensors 78, 79 and 81 which emit electrical output signals which are a measure of the brake pressures present in the front wheel brakes 14, 16 and in the rear wheel brakes 17, 18. The sensors 76, 77, whose output signals are a measure of the brake pressure required values which the driver wishes to select by way of the brake unit 13 and the brake pressure sensors 78, 79 and 81, whose output signals are a direct measure of the given actual values of the brake pressures in the front wheel brakes 14, 16 and in the rear wheel brakes 17, 18, permit a required/actual value comparison of these parameters in a simple manner and, from this comparison, appropriate control signals can be very rapidly obtained for the brake pressure control valves 46, 47.

If, in the course of a braking action which has begun slowly and with a modest pedal actuation force, the traffic situation makes it suddenly necessary to brake substantially more strongly, i.e., more sharply, with the result that the response threshold value $\dot{\phi}_s$ of the pedal speed is exceeded and if, as a result, the brake pressure control device 11 is first actuated during the course of a braking action, this has the result, in the embodiment of the brake system 10 shown in FIG. 1, that the brake pedal 19 initially collapses, when the function control valves 38, 39 are switched over, until such time as the outlet pressure present in the outlet pressure spaces 22, 23 of the brake unit 13 has also appeared in the buffer reservoirs 41, 42.

In order to avoid this pedal reaction which can be undesirable because it gives the impression of an erroneous function of the brake system 10, buffer reservoirs 41′, 42′ are provided in the embodiment of FIG. 2. In these buffer reservoirs, the preloading of the return springs 59′ displacing the reservoir pistons 58 into their positions associated with minimum volume of the reservoir chambers 61 follows up, by way of valve-controlled application of pressure to compensating pressure spaces 84 of these buffer reservoirs 41′, 42′, the pressures present at the pressure outlets 33, 37 of the brake unit 13. This occurs such that the forces exerted by the return springs 59′ on the reservoir pistons 58 to hold them in their basic position are equal to those forces arising from the areas $F_p$ of the reservoir pistons 58 multiplied by the brake pressures present in the wheel brakes 14, 16 and 17, 18.

For the foregoing purpose, the return springs 59′ of the buffer reservoirs 41′, 42′, as shown in FIG. 2 only for the buffer reservoir 42′ of the subsidiary unit 11″ (of the brake pressure control device 11) associated with the rear axle brake circuit II, are (in contrast to the embodiment of FIG. 1) supported on a displaceable compensating piston 83 corresponding in its dimensions to the reservoir piston 58 and itself movable, in a pressure-tight manner, in the axial direction in the housing 82 of the buffer reservoir 42′. The compensating piston 83 forms the axially movable boundary of a control pressure space 84 which is bounded by an end wall 86a connected to the housing 82. The compensating piston 83 is pressed by the action of the return spring 59′ against this end wall 86a and is held in contact therewith when the control pressure space 84 is unpressurized and/or the pressure present in the reservoir chamber 61 is greater than the control pressure connected into the control pressure space 84 of the buffer reservoir 42′.

The increase or reduction of the preload on the helical spring 59′ proportional to the outlet pressures of the brake unit 13 takes place, for example, by pulsed selection of the positions of the follow-up valves 86 and 87 via which the control pressure spaces 84 of the buffer reservoirs 41′, 42′ can be connected to the high pressure outlet 56 of the auxiliary pressure source 48 or, alternatively, to the storage reservoir 49 of the brake unit 13.

These follow-up valves 86, 87 are configured as 3/3-way solenoid valves whose basic position 0 connects the control pressure space 84 of the particular pressure modulator 41′ or 42′ to the storage reservoir 49 of the brake unit 13 and the auxiliary pressure source 48 and shuts the control pressure off from the high pressure outlet 56 of the auxiliary pressure source 48. The excited position I of the follow-up valves 86, 87, taken up on excitation of their control magnets 88 by a relatively low excitation current (of, e.g. 3 A) is a shut-off position in which the particular control pressure space 84 of the pressure modulators 41', 42' is shut off from both the high pressure outlet 56 of the auxiliary pressure source 48 and the storage reservoir 49. Excitation of their control magnets 88 by a relatively stronger excitation current (of, e.g. 6 A) brings the follow-up valves 86, 87 into their excited position II in which the particular control pressure space 84 is connected, via a flow path 89, to the high pressure outlet 56 of the auxiliary pressure source 48 and is shut off from its storage reservoir 49.

The selection of the position of the follow-up valve 86, by way of which the control pressure space of the pressure modulator 41' of the subsidiary unit 11' of the brake pressure control device 11 associated with the front axle brake circuit I is pressurized and relieved, takes place by comparative processing of the output signal of the pressure sensor 76 characteristic of the pressure in the primary outlet pressure space 22 of the brake unit 13 and the output signals of a pressure sensor 80 connected to the control pressure space of the buffer reservoir 41'. Similarly, the selection of the position of the follow-up valve 87 of the subsidiary unit 11" of the brake pressure control device, associated with the rear axle brake circuit II takes place by comparative processing of the output signals of the pressure sensor 77 characteristic of the pressure in the secondary outlet pressure space 23 of the brake unit 13 and the output signals of a pressure sensor 85 characteristic of the pressure in the control pressure space 84 of the buffer reservoir 42'. This processing of the output signals mentioned takes place in an electronic control unit of the brake pressure control unit 11 appropriately modified with respect to the control unit 72 described with reference to FIG. 1.

In all other respects, however, the embodiment of FIG. 2 is structurally and functionally identical to that of FIG. 1.

The embodiment of FIG. 3 differs from that of FIG. 1 in the configuration of the function control valves 38', 39' and of the pressure modulators 43', 44' but otherwise, with respect to the other components of the brake pressure control device 11, it is of the same general design and is overall functionally equivalent to the embodiment of FIG. 1.

The two function control valves 38', 39' are configured in FIG. 3 as 2/2-way solenoid valves whose basic position 0 is their shut-off position in which the outlet pressure spaces 22, 23 of the brake unit 13 are shut off from the particular buffer reservoir 41, 42, respectively and whose excited position I is their flow position.

The pressure modulators 43' and 44' are configured as the single-circuit main cylinder type and their piston 91 forms a pressure-tight movable boundary between an outlet pressure space 92 which is permanently connected to the pressure inlet 34 of the anti-lock brake system 12 associated with the rear axle brake circuit II and control pressure space 93 which functionally corresponds to the control pressure space 54 of the pressure modulators 43 and 44 of the embodiment of FIG. 1. The piston 91 is pressed by a return spring 57 into its basic position corresponding to the maximum volume of the outlet pressure space 92 and minimum volume of the control pressure space 93. A follow-up hole 94 which is connected, via a pressure medium path 96 or 97, respectively, to the pressure outlet 33 of the primary outlet pressure space 22, associated with the front axle brake circuit I or to that pressure outlet 37 of the secondary outlet pressure space 33 of the brake unit 13 which is associated with the rear axle brake circuit II. In the basic position of the modulator piston 91, the hole 94 is open, i.e. it communicates with the outlet pressure space 92 of the particular pressure modulator 43' or 44'. When the pistons 91 of the two pressure modulators 43', 44' are in their basic positions, therefore, brake fluid can be displaced from the outlet pressure spaces 22 and 23 of the brake unit 13, via the pressure medium conduits 96 and 97, into the outlet pressure spaces 92 and, via these spaces, to the pressure inlets 31, 34 of the anti-lock brake system 12 and, thereby into the front wheel brakes 14, 16 and the rear wheel brakes 17, 18.

The pressure medium conduits 96, 97 which each form a bypass around the two function control valves 38', 39' are shut off from the particular pressure outlet 33 or 37, respectively, of the brake unit 13 after a small initial section of the brake pressure build-up stroke of the particular modulator piston 91 as soon as its lip seal on the outlet pressure space side has passed over the follow-up hole 94. When the brake pressure control device 11 is actuated, therefore, the brake pressure build-up in the front wheel brakes 14, 16 and in the rear wheel brakes 17, 18 again takes place exclusively by way of the displacement of the modulator piston 91 which is controlled by the brake control valves 46, 47 in a completely analogous manner to the embodiments of FIGS. 1 and 2.

Figure 4:
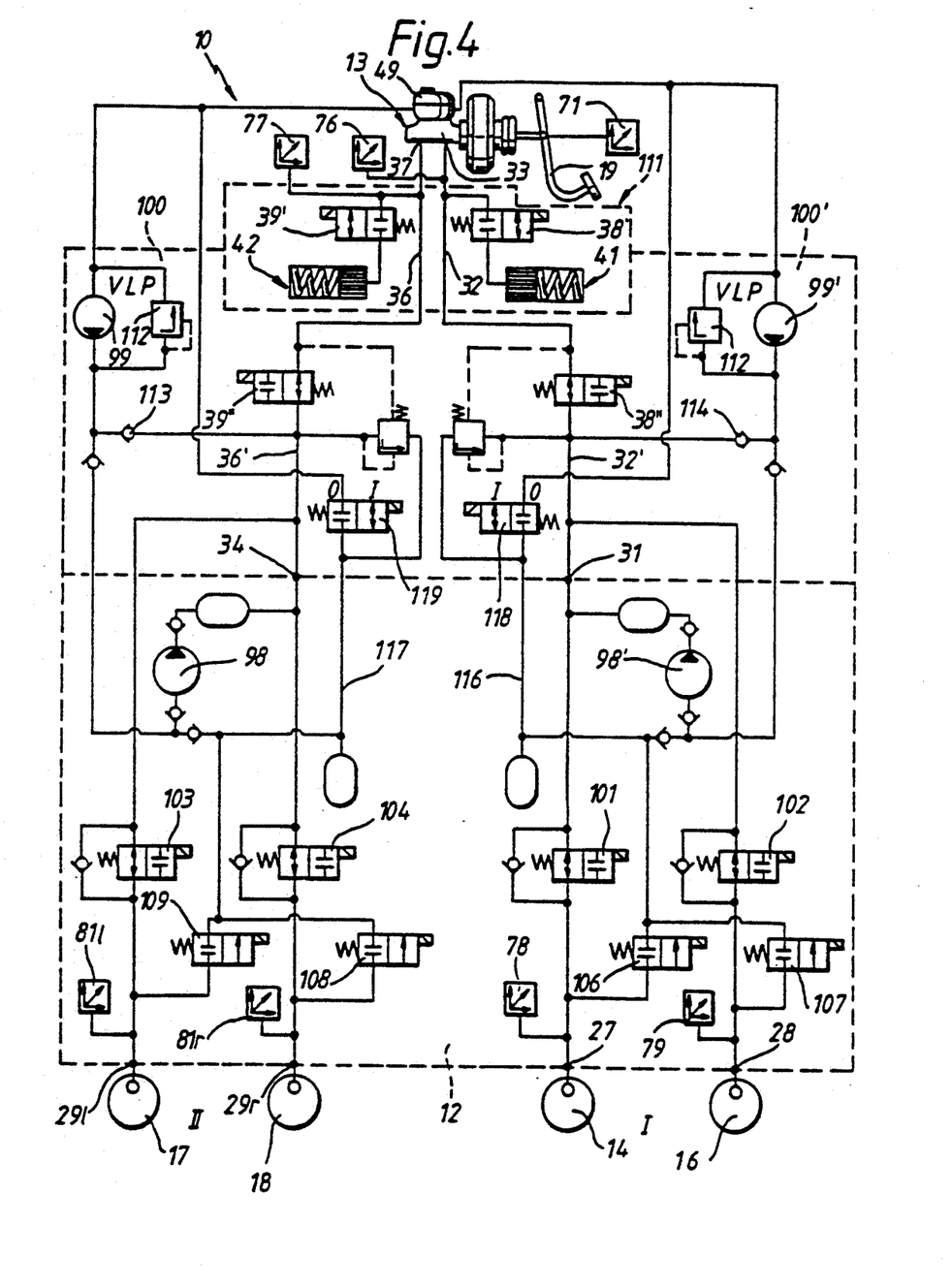
FIG. 4 is a schematic electro-hydraulic block circuit diagram of a brake system ior a road vehicle which is equipped with a four-channel anti-lock brake system which operates on the recirculation principle, having an acceleration skid regulation device acting on the driven vehicle wheels and having, integrated into these feedback and open-loop control devices, a brake pressure control device for which the components of the anti-lock brake system and the acceleration skid regulation device are concomitantly utilized for analogous purposes.

The embodiment of FIG. 4 is functionally equivalent to that of FIG. 2 but differs, from a constructional point of view, therefrom, and also from the embodiments of FIGS. 1 and 3, in that in order to bring about the brake pressure control device configured, as it were, as the function block 11 in the embodiments of FIGS. 1 to 3, use is also made of components of the anti-lock brake system 12 and of the acceleration skid regulation system 100, with which the vehicle represented by the brake system 10 of FIG. 4 is also equipped. In such a vehicle, therefore, in which electronic control of the front axle/-rear axle braking force distribution is also possible, the brake pressure control device can be brought about with a relatively small amount of additional complication, which is essentially limited to the fact that a control device 100' corresponding to the acceleration skid regulation system is also provided for the front axle brake circuit I and, in addition, there is a hydraulic subsidiary unit designated generally by numeral 111, which includes the two buffer reservoirs 41, 42 individually associated with the front axle brake circuit I and the rear axle brake circuit II, respectively, and function control valves 38', 39' by way of which the buffer reservoir 41 and the buffer reservoir 42, respectively, can be connected to their associated pressure outlets 33, 37 of the brake unit 13, here shown schematically and greatly simplified.

The elements of the brake system 10 shown in FIG. 4 are provided with the same references as the elements of the brake systems 10 shown in FIGS. 1 to 3 where there are structural and functional identity and analogy therebetween.

Inlet valves 101 to 104 and outlet valves 106 to 109, individually associated with the wheel brakes 14, 16 and 17, 18 and provided as part of the anti-lock brake system 12, which operates on the recirculation principle, are used to control brake pressure reduction, brake pressure retention and brake pressure build-up phases of the particular type of regulation, at the rear axle, both during an anti-lock braking regulation cycle and during a acceleration skid regulation cycle. These valves are also utilized for the same function during brake pressure control, which is initiated when the brake pedal 19 is actuated with a velocity exceeding the threshold value $\phi_s$. The return pump 98 of the rear axle brake circuit II is used as the pressure source for the acceleration skid regulation system which operates on the principle that a driven vehicle wheel tending to spin is slowed down again by the actuation of its wheel brake 17 or 18. Brake fluid is fed into the return pump 98 during acceleration skid regulation operation by a booster pump 99 which pumps brake fluid from the storage reservoir 49 of the brake unit 13 to the inlet side of the return pump 98 and, considered on its own, generates an outlet pressure of up to 10 bar. Similarly, the return pump 98' associated with the brake pressure control on the front axle brake circuit I and a booster pump 99' additionally provided for the front axle brake circuit I are again used as the auxiliary pressure source for brake pressure control on the front axle brake circuit I. This booster pump 99' similarly pumps brake fluid from the storage reservoir 49 to the inlet side of the return pump 98' of the front axle brake circuit I.

The two booster pumps 99, 99' are each connected in parallel with a pressure limiting valve 112 which limits the outlet pressure of the particular booster pump 99 or 99' to the above-mentioned value of 10 bar. On their outlet sides, they are connected, via outlet non-return valves 113, 114, respectively, to the sections 32' and 36', respectively, of the main brake pipes 32 and 36 of the front axle brake circuit I and of the rear axle brake circuit II, branching to the front wheel brakes 14, 16 and to the rear wheel brakes 17, 18, respectively. Consequently, a moderate brake pressure can be built up in the particular wheel brakes 14, 16 and 17, 18 in the course of the brake pressure control by the exclusive actuation of the booster pumps 99', 99.

A 2/2-way valve 39" shuts off the section 36' of the main brake pipe 36 of the rear axle brake circuit II branching to the rear wheel brakes 17, 18 from the pressure outlet 37 of the brake unit 13 associated with this rear axle brake circuit II, and is the ASR function control valve of the acceleration skid regulation system (ASR) 100. It is also used in the course of the brake pressure control for the same function. A function control valve 38", analogous to the function control valve 39", can shut off analogous to the function control valve 39", can shut off the section 32', of the main brake pipe 32 of the front axle brake circuit I branching to the front wheel brakes from the pressure outlet 33 of the brake unit 13, associated with the front axle brake circuit I in the course of a brake pressure control phase In combination with the 2/2-way solenoid valve 39' of the subsidiary hydraulic unit 111, the ASR function control valve 39" provides the function of the 3/3-way solenoid valve 39 provided as the function control valve of the brake pressure control system in the embodiment of FIG. 2. The same applies to the two function control valves 38', 38" of the embodiment of FIG. 4 with respect to their function analogous to the function control 3/3-way solenoid valve 38 of the embodiment of FIG. 2.

Brake pressure reduction valves 118, 199 permit, in brake pressure reduction phases of both the brake pressure control and the acceleration skid regulation at the rear axle, brake fluid to flow away from the respective return pipes 116 and 117 of the front axle brake circuit I and the rear axle brake circuit II to the storage reservoir 49 of the brake system 10. The valves 118, 119 are switched from their shut-off basic positions 0 into their flow positions I simultaneously with the switching of the function control valves 38', 38" and 39', 39" into their respective flow and shut-off positions.

The position sensor 71, the pressure sensors 76, 77 provided for recording the brake pressure required value, the pressure sensors 78, 79 for recording the actual brake pressure values at the front wheel brakes, and, in the embodiment of FIG. 4, the pressure sensors 81r, 81l associated with the two pressure outlets 29l, 29r of the anti-lock brake system 12 are, in configuration and function, analogous to the correspondingly designated sensors of the embodiments of FIGS. 1 to 3.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A brake pressure control device for a road vehicle having a pedal-actuated brake unit, a hydraulic multi-circuit brake system with static brake circuits, into which brake system pressures proportional to a pedal force can be connected by actuation of the brake unit, and an anti-lock brake system configured for dynamically stable deceleration behavior of the road vehicle and having a sensor device operationally arranged for recording the position of one of a brake pedal and of a brake unit element connected to the motion of the brake pedal and generating electrical output signals characteristic of the instantaneous position of the brake pedal, an electronic control unit for processing the output signals and generating control signals for an electrically controllable brake pressure setting device so that at least a higher brake pressure than an expected brake pressure value associated with the instantaneous pedal position is connected with front wheel brakes at least whenever the speed with which a position of a pedal changes during a brake pressure build-up actuation is greater than a specified threshold value in excess of zero, and at least one buffer reservoir controllable, via an operatively associated respective valve, by output signals of the electronic control unit and configured to be pressurized against a lower return force than that corresponding to a reaction force resulting from a reaction of the brake pressure on the brake unit, wherein the at least one buffer reservoir is operatively arranged to be connected, by position selection of the valve by an output signal of the electronic control unit actuating the brake pressure control device to a pressure outlet of the brake unit which is associated with that brake circuit in which higher level brake pressure occurs, and an outlet pressure space of the brake unit connected to the at least one buffer reservoir is shut off, under valve control, from the brake circuit subjected to the increased brake pressure on actuation of the brake pressure control device.

2. The brake pressure control device according to claim 1, wherein the at least one buffer reservoir comprises a buffer reservoir provided for two vehicle brake circuits.

3. The brake pressure control device according to claim 1, wherein the at least one buffer reservoir is configured with a preloaded return spring and a reservoir piston.

4. The brake pressure control device according to claim 3, wherein that at least buffer reservoir is provided with a preloading device configured such that, when the brake pressure control device is not actuated, the preload of the return spring at a value which corresponds to that force which results from the reservoir piston being subjected to the outlet pressure of the connected outlet pressure space of the brake unit.

5. The brake pressure control device according to claim 4, wherein the preloaded return spring is operatively arranged between two pistons, one of which pistons forms an axially movable boundary of the reservoir chamber and the other of which pistons forms an axially movable boundary of a control pressure space into which a pressure corresponding to the pressure in the connected outlet pressure space of the brake unit is permanently connected when the brake pressure control device is not actuated.

6. The brake pressure control device according to claim 5, wherein a pressure follow-up in the control pressure space of the at least one buffer reservoir is effected by an operative connection, via a pulse-controlled follow-up valve, of one of the outlet pressure of the auxiliary pressure source and the control pressure space to the unpressurized storage reservoir of the auxiliary pressure source.

7. The brake pressure control device according to claim 6, wherein the follow-up valve is configured as a 3/3-way solenoid valve arranged to be driven by a first control signal with a first relatively low control current from its basic position, in which the control pressure space is connected to the storage reservoir of the auxiliary pressure source and is shut off from a high pressure outlet of the auxiliary pressure source, into a first excited, shut-off position in which the control pressure space is shut off from both the high pressure outlet of the auxiliary pressure source and its storage reservoir, and which can be driven by a second control signal current which is relatively higher than the first control current into a second excited position, in which the control pressure space of the at least one buffer reservoir is connected to the high pressure outlet of the auxiliary pressure source and is shut off from its storage reservoir.

8. The brake pressure control device according to claim 5, wherein a pressure sensor is operatively arranged for recording the pressure in the control pressure space of the at least one buffer reservoir, and a pressure sensor is operatively arranged for recording the pressure in the connected outlet pressure space of the brake unit.

9. The brake pressure control device according to claim 3, wherein the at least one buffer reservoir comprises a buffer reservoir provided for each of the two vehicle brake circuits.

10. The brake pressure control device according to claim 1, in which the vehicle has front axle/rear axle brake circuit division, wherein at least one pressure sensor is operatively arranged for generating an electrical output signal characteristic of the pressure in the outlet pressure space of the brake unit associated with the front axle brake circuit, and at least one pressure sensor is operatively arranged for generating an electrical output signal characteristic of the pressure in at least one of the front wheel brakes.

11. The brake pressure control device according to claim 1, wherein for each outlet pressure space of the brake unit, a pressure sensor is operatively arranged for generating an electrical output signal characteristic of the particular outlet pressure, and at least one pressure sensor is operatively associated with each of the brake circuits.

12. The brake pressure control device according to claim 1, wherein at least one pressure modulator constitutes a brake pressure setting element of the brake pressure control device, in which modulator a piston forms a movable pressure-tight boundary between a control pressure space such that, when the control pressure space and an outlet pressure space are subjected to the valve-controlled outlet pressure of an auxiliary pressure source, the piston is arranged to be displaced in a direction of a brake pressure build-up in the brake circuit connected to the outlet pressure space, and, via valve-controlled connection to a storage reservoir of the auxiliary pressure source, the piston is arranged to be displaced in a direction of a pressure reduction in the connected brake circuit the piston being pressed by a preloaded, spring-elastic return element into its basic position corresponding to minimum volume of the control pressure space and maximum volume of the outlet pressure space.

13. The brake pressure control device according to claim 12, wherein the at least one buffer reservoir comprises a buffer reservoir provided for the two vehicle brake circuits.

14. The brake pressure control device according to claim 12, wherein brake pressure control valves are operatively arranged for connecting the control pressure space of the at least one pressure modulator alternately to the high pressure outlet of the auxiliary pressure source and to its storage reservoir and are configured as 3/3-way solenoid valves, whose basic position is a flow position shutting off the control pressure space of the at least one pressure modulator from the high pressure outlet but connecting it to the storage reservoir of the auxiliary pressure source, whose first excited position, taken up on excitation of the control magnet by a first control signal of relatively low control current is a shut-off position in which the control pressure space is shut off from both the high pressure outlet of the auxiliary pressure source and its storage reservoir, and whose second excited position, taken up on excitation of their control magnet by a second control signal of relatively higher control current than the first control signal is again a flow position in which the control pressure space of the pressure modulator is connected to the high pressure outlet of the auxiliary pressure source but is shut off from its storage reservoir.

15. The brake pressure control device according to claim 1, wherein 3/3-way solenoid valves are operatively arranged as function control valves which effect the connection of the at least one buffer reservoir at the associated outlet pressure space of the brake unit, the basic position of the solenoid valves being a flow position shutting off the associated outlet pressure space of the brake unit from the reservoir chamber of the at least buffer reservoir but connecting the associated outlet pressure space to the continuing section of the main brake pipe of the related brake circuit, the 3/3-way solenoid valves, on excitation of their control magnet by a first control signal of relatively low current taking up a first excited, shut-off position in which the outlet pressure space of the brake unit is shut off both from the reservoir chamber of the at least one buffer reservoir and from the continuing main brake pipe section and, on excitation of their control magnet by a second control signal of relatively higher current than the first control signal taking up a second excited position, which is again a flow position, in which the outlet pressure space of the brake unit is connected to the reservoir chamber of the at least one buffer reservoir but is shut off from the continuing main brake pipe section.

16. The brake pressure control device according to claim 1, wherein the at least one buffer reservoir is connected, via a respective 2/2-way solenoid valve, to one of the pressure outlets of the brake unit, and the electrically controllable brake pressure setting device constituted as at least one pressure modulator having an outlet pressure space connected to a brake pipe section continuing to one of an anti-lock brake system and the wheel brakes of the particular brake circuit and a piston forming a movable pressure-tight boundary between the outlet pressure space and a control pressure space is connected to the pressure outlet of the brake unit via a valve whose basic position is a flow position connecting the pressure outlet of the brake unit, in the basic position of the modulator piston, to the outlet pressure space of the pressure modulator and which, controlled by displacement of the modulator piston, reaches its shut-off position after a small fraction of the pressure build-up stroke of the modulator piston and is brought back to its open position by a return of the modulator piston to its basic position.

17. The brake pressure control device according to claim 16, wherein the at least one buffer reservoir comprises a buffer reservoir provided for each of the two vehicle brake circuits.

18. The brake pressure control device according to claim 1, wherein the device is configured as an additional unit to one of a conventional vehicle brake system and a vehicle brake system equipped with an anti-lock brake system.

19. The brake pressure control device according to claim 1, wherein, in a road vehicle which is equipped with at least one of both an anti-lock brake system and a device for acceleration slip regulation of the driven wheels and a device for electronically controlled front axle/rear axle brake force distribution, means is operatively arranged for subjecting the brake circuit of the non-driven vehicle wheels to brake pressure control, as a function of the brake pedal position and its changes.

20. The brake pressure control device according to claim 19, wherein the at least one buffer reservoir comprises a buffer reservoir provided for each of the two vehicle brake circuits.

21. The brake pressure control device according to claim 19, wherein, for a road vehicle with front axle/rear axle brake circuit division, rear-axle drive, an anti-lock brake system and an acceleration skid regulation system, a feedback and open-loop control system is comprised of a return pump of the rear axle brake circuit constituting the auxiliary pressure source, a booster pump is arranged to supply the rear axle brake circuit return pump with brake fluid, a second booster pump is connected upstream of a return pump of the front axle brake circuit, and, a subsidiary hydraulic unit which includes the at least one buffer reservoir constituted by two buffer reservoirs and function control valves of the brake pressure control unit configured as 2/2-way solenoid valves for connecting the two buffer reservoirs to and shutting the buffer reservoirs off from the outlet pressure spaces of the brake unit.

* * * * *